(12) United States Patent
Sarkisian et al.

(10) Patent No.: US 10,357,846 B2
(45) Date of Patent: Jul. 23, 2019

(54) METAL MATRIX COMPOSITE VEHICLE COMPONENT AND METHOD

(71) Applicant: Intellectual Property Holdings, LLC, Cleveland, OH (US)

(72) Inventors: Ryan G. Sarkisian, Cleveland, OH (US); Dan T. Moore, Cleveland Heights, OH (US)

(73) Assignee: Intellectual Property Holdings, LLC, Cleveland, OH (US)

(*) Notice: Subject to any disclaimer, the term of this patent is extended or adjusted under 35 U.S.C. 154(b) by 194 days.

(21) Appl. No.: 15/397,446

(22) Filed: Jan. 3, 2017

(65) Prior Publication Data

US 2017/0189990 A1 Jul. 6, 2017

Related U.S. Application Data

(60) Provisional application No. 62/273,683, filed on Dec. 31, 2015.

(51) Int. Cl.
*B23K 20/12* (2006.01)
*F16D 65/12* (2006.01)
(Continued)

(52) U.S. Cl.
CPC ............ *B23K 20/129* (2013.01); *B23K 20/12* (2013.01); *B60T 5/00* (2013.01); *F16D 65/125* (2013.01);
(Continued)

(58) Field of Classification Search
CPC ..... B23K 20/129; B23K 20/12; F16D 65/128; F16D 65/847; F16D 65/125;
(Continued)

(56) References Cited

U.S. PATENT DOCUMENTS 3,286,974 A 11/1966 Dean et al.
3,305,618 A 2/1967 Sucher
(Continued)

FOREIGN PATENT DOCUMENTS

DE 19710671 A1 9/1998
JP H02194132 7/1990
(Continued)

OTHER PUBLICATIONS

Dlouhy, A., et al., "Short Fibre Reinforced MMC/ Kurzfaserverstarkter . . . A Quantitative Metallographic Study . . . ," Prakt. Metallogr., vol. 30, pp. 172-185, 1993.
(Continued)

*Primary Examiner* — Kiley S Stoner
(74) *Attorney, Agent, or Firm* — Calfee, Halter & Griswold LLP

(57) ABSTRACT

An exemplary method for making a metal matrix composite vented brake rotor includes: providing a first side plate; providing a second side plate; and welding the first and second side plates together. The first and second side plates have outer surfaces, inner surfaces, and metal matrix composite portions extending from the outer surfaces to a distance from the inner surface that is less than a thickness measured between the inner surface and outer surface. The inner surface of the first side plate includes a vent portion. The step of welding includes welding the first vent portion to the second inner surface to form the vented brake rotor, the vented brake rotor having a plurality of vents formed by the first and second inner surfaces and the first vent portion.

20 Claims, 10 Drawing Sheets

(51) Int. Cl.
*F16D 65/847* (2006.01)
*B60T 5/00* (2006.01)
*F16D 65/02* (2006.01)
*F16D 65/78* (2006.01)

(52) U.S. Cl.
CPC ......... *F16D 65/128* (2013.01); *F16D 65/847* (2013.01); *F16D 2065/1328* (2013.01); *F16D 2065/1344* (2013.01); *F16D 2065/788* (2013.01); *F16D 2200/0004* (2013.01); *F16D 2200/0047* (2013.01); *F16D 2250/0076* (2013.01)

(58) Field of Classification Search
CPC ..... F16D 2065/1328; F16D 2250/0076; F16D 2065/1344; F16D 2065/788; F16D 2200/0004; F16D 2200/0047; B60T 5/00
See application file for complete search history.

(56) References Cited

U.S. PATENT DOCUMENTS

| | | | |
|---|---|---|---|
| 3,919,382 A | 11/1975 | Smarook | |
| 3,933,335 A | 1/1976 | Maruyama et al. | |
| 4,039,703 A | 8/1977 | Kamijo | |
| 4,587,707 A | 5/1986 | Nishida et al. | |
| 4,803,334 A * | 2/1989 | Burke | B23K 26/18 219/121.64 |
| 4,830,932 A | 5/1989 | Donomoto et al. | |
| 4,871,008 A | 10/1989 | Dwivedi et al. | |
| 4,998,578 A | 3/1991 | Dwivedi | |
| 5,024,795 A | 6/1991 | Kennedy | |
| 5,167,271 A | 12/1992 | Lange et al. | |
| 5,234,045 A | 8/1993 | Cisko | |
| 5,268,339 A | 12/1993 | Aghajanian | |
| 5,350,004 A | 9/1994 | Rocazella | |
| 5,413,194 A | 5/1995 | Kulis, Jr. et al. | |
| 5,511,603 A | 4/1996 | Brown et al. | |
| 5,529,620 A | 6/1996 | Corbett et al. | |
| 5,531,425 A | 7/1996 | Skibo et al. | |
| 5,535,857 A | 7/1996 | Barlow | |
| 5,575,112 A | 11/1996 | Scheubel | |
| 5,620,791 A * | 4/1997 | Dwivedi | C22C 1/1015 188/218 XL |
| 5,646,351 A * | 7/1997 | Good | G01N 29/26 702/166 |
| 5,698,240 A | 12/1997 | Haguchi | |
| 5,738,818 A | 4/1998 | Atmur et al. | |
| 5,743,983 A | 4/1998 | Ogata | |
| 5,958,551 A | 9/1999 | Garcia-Ochoa | |
| 6,062,351 A | 5/2000 | Strasser et al. | |
| 6,178,691 B1 | 1/2001 | Caron et al. | |
| 6,180,258 B1 | 1/2001 | Klier | |
| 6,193,915 B1 | 2/2001 | Lo et al. | |
| 6,216,829 B1 * | 4/2001 | Daudi | F16D 65/12 188/218 XL |
| 6,298,957 B1 | 10/2001 | Haug | |
| 6,309,743 B1 | 10/2001 | Fujita | |
| 6,358,628 B1 | 3/2002 | Kajikawa et al. | |
| 6,383,656 B1 | 5/2002 | Kimura et al. | |
| 6,544,636 B1 | 4/2003 | Fukunaga et al. | |
| 6,547,850 B1 | 4/2003 | Skibo et al. | |
| 6,601,284 B1 | 8/2003 | Wall | |
| 6,648,055 B1 | 11/2003 | Haug | |
| 6,662,852 B2 | 12/2003 | Gegel | |
| 6,684,561 B2 | 2/2004 | Poret | |
| 6,752,709 B1 | 6/2004 | Skibo et al. | |
| 7,459,110 B2 | 12/2008 | Lenke et al. | |
| 7,793,703 B2 | 9/2010 | Wood et al. | |
| 7,975,750 B2 * | 7/2011 | Dessouki | F16D 65/0018 164/100 |
| 8,016,018 B2 | 9/2011 | Wood et al. | |
| 8,075,827 B2 | 12/2011 | Loukus et al. | |
| 8,153,541 B2 | 4/2012 | McCullough et al. | |
| 8,455,379 B2 | 6/2013 | McCullough et al. | |
| 8,550,145 B2 | 10/2013 | Wood et al. | |
| 9,145,938 B2 | 9/2015 | Wood et al. | |
| 9,429,202 B2 | 8/2016 | Moore et al. | |
| 2001/0025751 A1 | 10/2001 | Gruber et al. | |
| 2002/0025356 A1 | 2/2002 | Ingram | |
| 2002/0088599 A1 | 7/2002 | Davis et al. | |
| 2002/0117286 A1 | 8/2002 | Fujita | |
| 2003/0038001 A1 | 2/2003 | Yamaguchi et al. | |
| 2003/0159896 A1 | 8/2003 | Koizumi et al. | |
| 2004/0094285 A1 | 5/2004 | Yamaguchi et al. | |
| 2004/0118547 A1 | 6/2004 | Brown et al. | |
| 2004/0177609 A1 | 9/2004 | Moore, III et al. | |
| 2005/0035173 A1 * | 2/2005 | Steel | B23K 20/1235 228/2.1 |
| 2005/0167214 A1 | 8/2005 | Yamamoto et al. | |
| 2005/0181193 A1 | 8/2005 | Lenke | |
| 2005/0183909 A1 * | 8/2005 | Rau, III | F16D 65/0006 188/218 XL |
| 2005/0184421 A1 | 8/2005 | de Nagybaczon | |
| 2005/0217950 A1 | 10/2005 | Jolley, Jr. et al. | |
| 2006/0085968 A1 | 4/2006 | Yamaguchi et al. | |
| 2007/0062768 A1 * | 3/2007 | Hanna | B22D 19/00 188/218 XL |
| 2007/0119667 A1 * | 5/2007 | Hanna | B22D 19/00 188/218 XL |
| 2007/0172639 A1 | 7/2007 | Kmetz | |
| 2007/0234929 A1 | 10/2007 | Reinsch et al. | |
| 2007/0284200 A1 * | 12/2007 | Hampton | F16D 65/123 188/218 XL |
| 2007/0284772 A1 | 12/2007 | Goller | |
| 2008/0258343 A1 | 10/2008 | Tado | |
| 2009/0020379 A1 * | 1/2009 | Hanna | B22D 19/00 188/218 XL |
| 2009/0026027 A1 * | 1/2009 | Martino | B22F 5/106 188/218 XL |
| 2009/0078515 A1 * | 3/2009 | Xia | B22D 19/00 188/218 XL |
| 2009/0165924 A1 | 7/2009 | Steibel et al. | |
| 2009/0309252 A1 | 12/2009 | Schuetz et al. | |
| 2009/0311541 A1 | 12/2009 | Wood et al. | |
| 2009/0312174 A1 | 12/2009 | McCullough et al. | |
| 2010/0000831 A1 | 1/2010 | Faria | |
| 2010/0001231 A1 | 1/2010 | Loukus et al. | |
| 2010/0126066 A1 | 5/2010 | Devos | |
| 2010/0152015 A1 | 6/2010 | Staudenecker et al. | |
| 2010/0276236 A1 * | 11/2010 | Kim | F16D 65/125 188/218 XL |
| 2011/0003680 A1 | 1/2011 | Lindemann et al. | |
| 2011/0061830 A1 | 3/2011 | Wood et al. | |
| 2012/0067537 A1 | 3/2012 | Hanna | |
| 2012/0080277 A1 | 4/2012 | Wood et al. | |
| 2012/0227624 A1 | 9/2012 | Loukus et al. | |
| 2012/0295784 A1 | 11/2012 | McCullough et al. | |
| 2013/0015607 A1 | 1/2013 | Ueda | |
| 2013/0048447 A1 * | 2/2013 | Hanna | F16D 65/12 188/218 XL |
| 2013/0087420 A1 | 4/2013 | Fraley et al. | |
| 2013/0167440 A1 | 7/2013 | Fischer | |
| 2013/0180812 A1 * | 7/2013 | Brown | F16D 65/0018 188/218 XL |
| 2013/0264156 A1 * | 10/2013 | DeConti | F16D 65/128 188/218 XL |
| 2013/0277155 A1 * | 10/2013 | Huang | B22D 19/0081 188/71.6 |
| 2013/0295304 A1 | 11/2013 | Moore et al. | |
| 2013/0295394 A1 | 11/2013 | Moore | |
| 2014/0008893 A1 | 1/2014 | Loukus et al. | |
| 2014/0231195 A1 * | 8/2014 | Amari | F16D 65/12 188/218 XL |
| 2014/0272451 A1 | 9/2014 | Loukus et al. | |
| 2015/0283647 A1 * | 10/2015 | Kitazawa | B23K 20/02 428/614 |
| 2016/0108980 A1 | 4/2016 | Moore et al. | |
| 2017/0175834 A1 * | 6/2017 | Bracamonte | B32B 15/01 |
| 2017/0184164 A1 * | 6/2017 | Bean | F16D 65/12 |

(56) References Cited

U.S. PATENT DOCUMENTS

FOREIGN PATENT DOCUMENTS

| JP | H0344432 | 2/1991 |
| JP | 2004360136 | 12/2004 |
| WO | 8502394 | 6/1985 |
| WO | 1999011448 | 3/1999 |
| WO | 1999032418 | 7/1999 |
| WO | 2005087575 | 9/2005 |
| WO | 2007033378 | 3/2007 |
| WO | 2009154728 | 12/2009 |
| WO | 2009154734 | 12/2009 |
| WO | 2012076154 | 6/2012 |
| WO | 2015179420 A1 | 11/2015 |

OTHER PUBLICATIONS

Mukerji, J., "Ceramic Matrix Composites," Defence Science Journal, vol. 43, No. 4, pp. 385-395, Oct. 1993.

KS Aluminium-Technologie AG Brochure, "High-Pressure Die Cast and Squeeze Cast Engine . . . ," 6 pages. www.kspg.com/en/divisions/hardparts/ks-aluminium-technologie/ (Date unknown.).

Everwin, P., et al., "Porsche Boxster, Lokasil®—Zylinderlaufflächen: Eine neue Verbundwerkstoff-Lösung geht mit dem Porsche Boxster in Serie," ATZ. Automobiltechnische Zeitschrift, pp. 66-69, 1996 (in German).

Non-Certified English Translation of Everwin, P., et al., "Porsche Boxster, Lokasil®—Zylinderlaufflächen: Eine neue Verbundwerkstoff-Lösung geht mit dem Porsche Boxster in Serie," ATZ. Automobiltechnische Zeitschrift, pp. 66-69, 1996 Reference. Prepared by Viami International Inc.

Long, S. et al., "Processing of Al-based MMCs by Indirect Squeeze Infiltration of Ceramic Preforms . . . ," pp. 1-23, Jun. 1999.

Evans, A., et al., "Metal Matrix Composites in Industry: An Introduction and a Survey," Kluwer Academic Publishers, p. 241, 2003.

Lenke, Ilka T., et al., "Design of metal ceramic composites," Int. J. Mat. Res., vol. 97, Issue 5, pp. 676-680, 2006.

Dobrzanski, L.A., "Fabrication of ceramic preforms based on . . . ," Journal of Achievements in Materials and Manufacturing Engineering, vol. 18, Issue 1-2, pp. 71-74, Sep.-Oct. 2006.

Dobrzanski, L.A., "Influence of reinforcement shape on the structure and properties of . . . ," 11th Int'l. Research/Expert Conference, "Trends in the Development of Machinery and Associated Technology," TMT 2007, Hammamet, Tunisia, pp. 1479-1482, Sep. 5-9, 2007.

Unifrax Product Information Sheet, "Fiberfrax Ceramic Fiber Paper," Unifrax I LLC, 4 pages, 2009. www.unifrax.com.

Light-Weighting Technology by Century, Inc. 2 pages, www.light-weighting.com (Date Unknown).

Search Report for International Patent Application No. PCT/US2017/016670 dated Apr. 10, 2017.

Mancha-Molinar et al., "Role of T7 Heat Treating on the Dimensional Stability of Automotive A319 A1 Alloys," SAE Technical Paper Series, Society of Automotive Engineers, Warrendale, PA, US, vol. 2004-01-1002, Jan. 1, 2014, p. 13pp,XP009193834, ISSN: 0148-7191 p. 3-p. 6.

Mahadevan, R., et al.,"Development of Selectively Reinforced Squeeze Cast Pistons," Nov. 1, 2001, XP55357185, DOI:10.4271/2001-28/0069, Retrieved from the Internet: URL://www.foundryinfo-india.org/images/pdf/72_OP.pdf on Sep. 29, 2017.

Search Report for International Patent Application No. PCT/2017/012037 dated Apr. 24, 2017.

Office Action for U.S. Appl. No. 15/425,284 dated Feb. 25, 2019.

\* cited by examiner

METAL MATRIX COMPOSITE VEHICLE COMPONENT AND METHOD

CROSS-REFERENCE TO RELATED APPLICATIONS

The present application claims the benefit of U.S. Provisional Application Ser. No. 62/273,683, filed on Dec. 31, 2015, titled VENTED METAL MATRIX COMPOSITE BRAKE ROTOR AND METHOD, the disclosure of which is incorporated herein by reference in its entirety.

TECHNICAL FIELD

The present application relates generally to methods of making metal matrix composite vehicle components, and more specifically to methods of making metal matrix composite vented brake rotors.

BACKGROUND OF THE INVENTION

A metal matrix composite (MMC) is generally made by incorporating a reinforcing material into a metal matrix. For example, a MMC may comprise a ceramic preform that is infiltrated with a metal. A MMC generally has properties and physical characteristics different from metal that may be desirable depending on the application. For example, relative to the metal surrounding an MMC, the MMC may have higher specific strength, a higher Young's modulus, higher temperature resistance, higher transverse stiffness and strength, higher resistance to moisture absorption, higher electrical and thermal conductivity, lower density, and higher wear resistance. The particular physical properties of MMCs are often dependent on the final application and may be modified by changes in both the matrix and metal alloy used.

Vehicles often include disc brakes. A disc brake generally comprises a rotating brake rotor. Calipers having brake pads that squeeze the exterior and interior of the brake rotor to cause friction and reduce the rotation of the brake rotor. During the vehicle braking process there is often a high energy transfer to the frictional surface of the brake rotor which can lead to a rise in temperature.

SUMMARY

Exemplary embodiments of methods of making vehicle components such as vented brake rotors are disclosed herein.

An exemplary method for making a metal matrix composite vented brake rotor includes: providing a first side plate; providing a second side plate; and welding the first and second side plates together. The first and second side plates have outer surfaces, inner surfaces, and metal matrix composite portions extending from the outer surfaces to a distance from the inner surface that is less than a thickness measured between the inner surface and outer surface. The inner surface of the first side plate includes a vent portion. The step of welding includes welding the first vent portion to the second inner surface to form the vented brake rotor, the vented brake rotor having a plurality of vents formed by the first and second inner surfaces and the first vent portion.

Another exemplary embodiment of the present disclosure relates to a method for making a metal matrix composite vented brake rotor having metal matrix composite wear surfaces, the method including: preparing a ceramic compound having reinforcing fibers and ceramic particles; forming first and second ceramic preforms from the ceramic compound; forming first and second metal matrix composite brake components by infiltrating the first and second ceramic preforms with molten metal; and welding the first and second side plates together. The first and second metal matrix composite brake components have outer surfaces, inner surfaces, and metal matrix composite portions extending from the outer surfaces to a distance from the inner surface that is less than a thickness measured between the inner surface and outer surface. The inner surface of the first metal matrix composite brake component includes a vent portion. The step of welding includes welding the first vent portion to the second inner surface to form the vented brake rotor, the vented brake rotor having a plurality of vents formed by the first and second inner surfaces and the first vent portion.

Still another exemplary embodiment of the present disclosure relates to a method for making a metal matrix composite vehicle component having localized metal matrix composite portions, the method including: providing a first vehicle component having a first metal matrix composite portion and a first metal portion that is substantially free from metal matrix composite material; providing a second vehicle component having a second metal matrix composite portion and a second metal portion that is substantially free from metal matrix composite material; and welding the first and second metal portions together to form the metal matrix composite vehicle component

BRIEF DESCRIPTION OF THE DRAWINGS

These and other features and advantages of the present invention will become better understood with regard to the following description and accompanying drawings in which.

DETAILED DESCRIPTION

Figure 1:
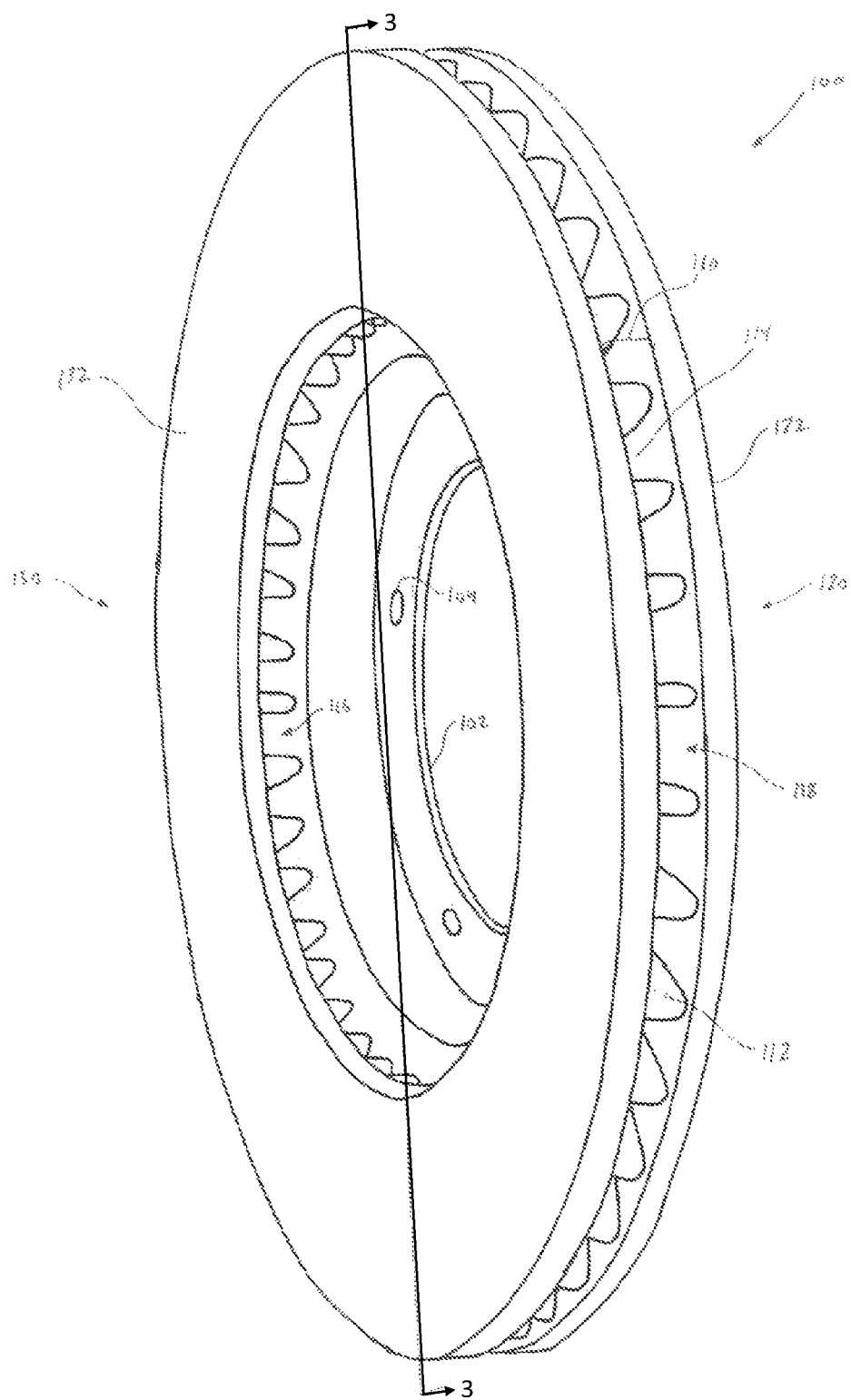
FIG. 1 is a perspective view of a vented brake rotor.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

A MMC is generally made by incorporating a reinforcing material into a metal matrix, thereby enhancing the structure of the composite material. The MMC generally comprises two portions: a primarily inorganic metal portion and a porous structure made from other inorganic components, such as fused silicon carbide. For example, a MMC may be formed from a ceramic preform that is infiltrated with a metal alloy, such as aluminum. Applicant has developed various MMCs and methods of making MMCs, including aluminum MMCs. Examples of such MMCs and their related methods are described in U.S. Pat. No. 9,429,202 (herein "the '202 patent") and U.S. Published Patent Application No. 2016/0108980 (i.e., U.S. application Ser. No. 14/536,311; herein "the '311 application"), both of which are incorporated herein by reference in their entirety. To the extent the material incorporated by reference contradicts or is inconsistent with the present specification, the present specification will supersede any such material. The citation of any references herein is not an admission that such references are prior art to the present invention.

Metal matrix composites embedded with a light weight metal, such as an aluminum alloy, are useful in many industries, such as, for example, aerospace, automotive, heavy trucks, rail, defense, and others. Components made from light weight metal alloys that include localized MMC portions may be used in any portion of a vehicle to reduce the weight of the component while maintaining or improving other characteristics of the material, such as, for example, wear resistance, durability, strength, thermal conductivity, or the like. Many different vehicle components that include localized MMC portions (i.e., the MMC portion is restricted to a certain area of the component) may be formed and joined together using the methods described in the present application. While forming rotating and rotationally symmetric components having localized MMC portions—in particular, brake rotors—are discussed in detail below, other non-rotating and non-rotationally symmetric vehicle components, such as portions of a vehicle body, vehicle frame, or vehicle suspension can also be made using the methods described below.

The reduced weight of aluminum MMCs is particularly beneficial as a replacement for heavy components in vehicles, such as, for example, brake rotors that traditionally are made from cast iron. For example, the rear brake rotor of a 2015 Ford Fusion weighs approximately 11.5 pounds, whereas an aluminum MMC brake drum weighs less than 5.3 lbs. This weight reduction improves the fuel economy of the car and—by reducing the unsprung weight—reduces vibration and noise, improves handling, and increases the longevity of the vehicle. A brake rotor incorporating MMC materials into its wear surfaces can also have improved wear resistance, as described in the '311 application.

Rotors in disc brakes can be vented and non-vented. Vented brake rotors may be formed by machining the vents out of a solid piece of material, but doing so is time consuming and generates significant quantities of scrap material. Additionally, some vent geometries are not possible to machine from the exterior of the rotor.

Rather than machining the vents a vented brake rotor can also be cast as a single piece with the vents being shaped by portions of the mold. The cast part is then machined to final dimensions. Cast parts can also incorporate MMC materials.

Some previous attempts at developing MMC brake rotors were not particularly successful due to the use of a stir casting technique. This technique does not produce a mixture having a uniform distribution of the silicon carbide particles throughout the aluminum alloy.

For example, Duralcan (a stir casting technique used to combine silicon carbide with aluminum) was used to produce a vented brake rotor for the Chrysler Prowler, but there were significant distribution issues. Specifically, the silicon carbide was not uniformly distributed within the aluminum alloy resulting in some particles of silicon carbide protruding from the surface of the rotor, in addition to other inconsistencies. Another issue with Duralcan is that the silicon carbide particles are distributed throughout the entire brake rotor. Consequently, machining the cast part requires special tools as silicon carbide is interspersed throughout the aluminum. Various shortcomings of the Duralcan process are described in U.S. Pat. No. 6,547,850. The stir casting apparatus designed by Alcan Aluminum Company is described in U.S. Pat. No. 5,531,425.

Rather than mixing MMC materials throughout a vehicle component, applicant has shown—e.g., in the '202 patent and '311 application—that certain vehicle brake components can be formed with localized MMC portions. These MMC components are created by providing an MMC preform in the desired location before casting the part. The molten metal used to cast the part infiltrates the ceramic preform to form a localized MMC portion of the final cast part. For example, a MMC portion can be formed on the wear surfaces of a brake rotor, as shown in FIG. 6A of the '311 application.

When forming a component—such as a vehicle component—including a MMC portion, a ceramic preform is generally made first. The ceramic compound used to form the ceramic preform may include a variety of components, such as, for example, ceramic particles, reinforcing fibers, starch, organic porous creating materials, low temperature binders, high temperature binders (e.g., colloidal silica), and/or water.

An exemplary method of preparing a ceramic compound is disclosed below. First, the reinforcing fibers may be used in a detangling process. The dry materials (e.g., ceramic particles, reinforcing fibers, starch, and organic porous creating materials) are then added stepwise into a one-pot system and aggravated. The wet materials (e.g., low and high temperature binders and water) may then be added slowly into the same one-pot mixture, agitated, and then mixed under reduced pressure. This homogeneous one-pot mixture generally lacks voids and has randomly oriented fibers and a malleable consistency. The mixture is then loaded into a press and is compressed by male and female molds. This compression molding technique provides uniform structure to the preform. Once the preform is molded, it is removed from the press and is slowly dried in a humid environment, supported by an absorptive liner. Once water is removed from preform, the preform and the absorbing liner are heated to extreme temperatures to remove organic materials and to fuse inorganic ceramic particles. Upon cooling, the ceramic preform is machined to proper dimensions, the outer layer of skin is removed, and the pores of preform are exposed.

Next, the preform is generally infiltrated with a metal that is determined based on the desired properties of the MMC component. This is done through placing the heated preform in a die, pressurizing aluminum into the mold cavity with sufficient pressure to impregnate the preform and to reach the desired casting pressure. The infiltration of the preform may be facilitated through squeeze casting or slow injection die casting. The cast part may then undergo heat treating and machining to the desired characteristics and dimensions of the vehicle component.

Forming a vented brake rotor with MMC portions on both wear surfaces from two separate components provides various advantages. In particular, forming two separate components each having an MMC portion allows for complex vent geometries to be formed—e.g., those with complicated curves or many different and non-linear flow paths. Additionally, alignment of the ceramic preforms in each of the two components can be maintained more easily as the ceramic preform is positioned only on one side of the mold. Thus, a vented brake rotor may be formed by joining two side plates together to enclose a plurality of vents. One or both side plates may have vanes or posts machined into the mating surface so that vents are formed when the two side plates are joined. In some embodiments, two separate infiltration die molding systems may be utilized to create each half of the vented brake rotor, or a die system set with two separated designs could be utilized. After the two parts are removed from the die and cooled the two halves can be machined to accurate dimensions.

According to the embodiments of the present application, the side plates may be welded together. Each side plate is formed with an MMC portion on the wear surface—e.g., the outer surface of the brake rotor—and may be machined prior to being joined together. While the MMC portions can be difficult to machine and weld, the inner mating surfaces are formed of metal (e.g., aluminum) with no MMC portions such that the metal without MMC portions can be machined and joined without the added complexity required by the MMC portions. These inner surfaces can also be machined to form various vent geometries that would be difficult to achieve or even impossible using conventional using single-piece casting methods because of the difficulties associated with machining MMC materials as discussed above. Further, welding MMC materials is problematic because of embrittlement of the MMC material caused by increased temperatures experienced during welding or cracking caused during rotational welding (described below). Thus, machining and welding two halves of an MMC brake rotor together is not viable with halves that are formed with MMC material that is homogeneously distributed throughout the rotor.

Figure 2:
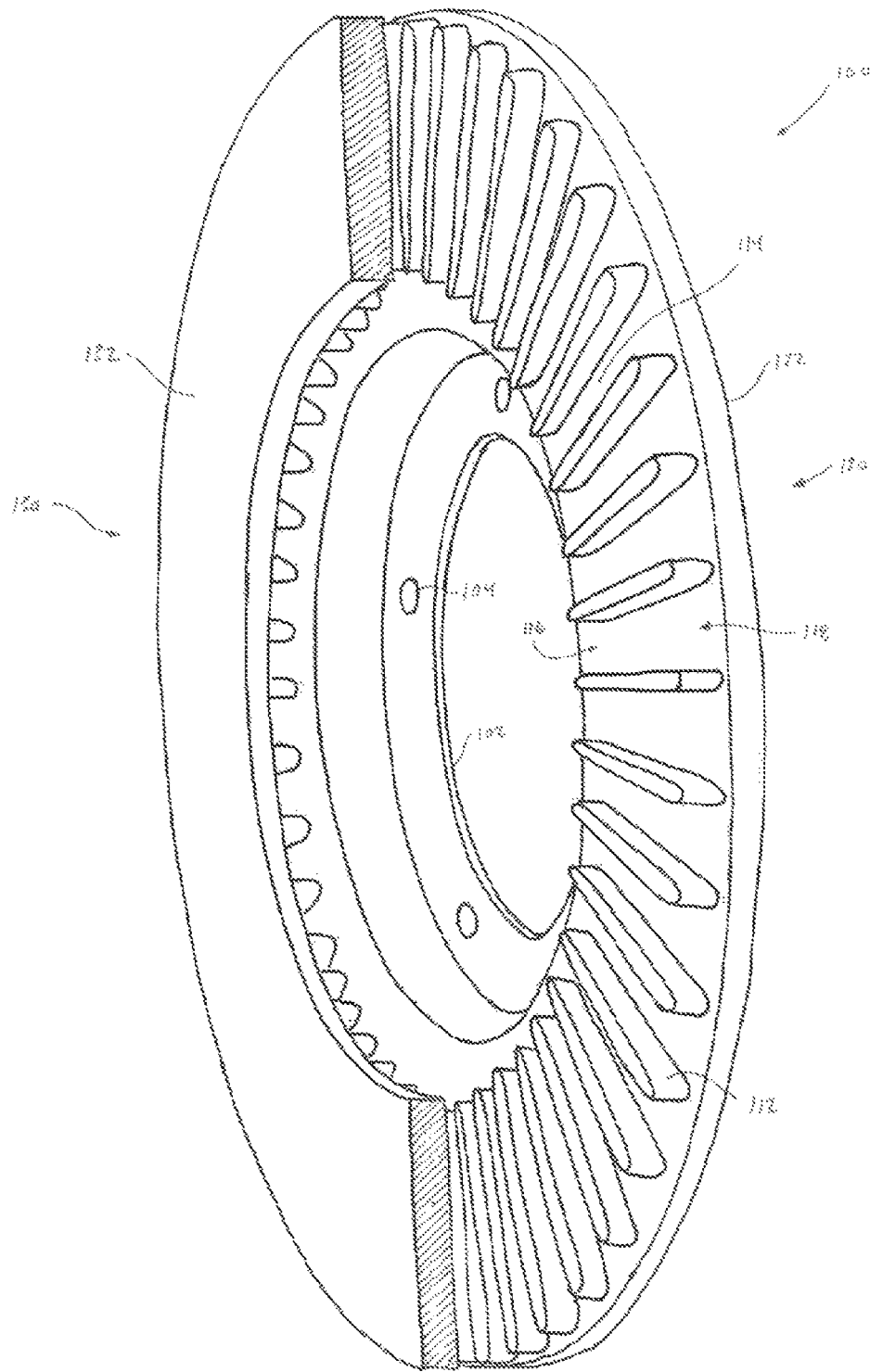
FIG. 2 is a perspective view of the vented brake rotor of FIG. 1 with a portion of one of the rotor plates removed to expose the vents.

Referring now to FIGS. 1 and 2, an exemplary vented brake rotor 100 is shown. The vented brake rotor 100 includes a vented area 110 formed between a first side plate 120 and a second side plate 130. The diameter of the brake rotor 100 is about 10 inches to about 15 inches. In some embodiments, the diameter of the brake rotor 100 is about 10 inches to about 12 inches or about 11.8 inches. Each side plate 120, 130 includes an outer or wear surfaces 122, 132. The thickness of the brake rotor 100 between the outer surfaces 122, 132 is about 0.6 to about 1.6 inches. In some embodiments, the thickness of the brake rotor 100 is about 1.1 inches. The brake rotor 100 is connected to and rotates with a wheel of a vehicle through the hub 102. A brake caliper is actuated to squeeze against the wear surfaces 122, 132 to generate friction, thereby generating a braking force and stopping the brake rotor 100 and connected wheel from rotating.

The first side plate 120 is integrally formed with the hub 102. In some embodiments, the hub 102 is integrally formed with the second side plate 130 and extends through an opening in the first side plate. The diameter of the hub 102 is about 4 inches to about 8 inches. In some embodiments, the diameter of the hub 102 is about 5.5 inches to about 6.5 inches, or about 5.9 inches. In some embodiments, the hub 102 is a separate component that is attached to the first or second side plate with fasteners or some other attachment means. The hub 102 is connected to a vehicle axle and wheel (not shown) through bolt holes 104, though any suitable means may be used to attach the hub 102 to the vehicle.

The vented area 110 is enclosed by the first and second side plates 120, 130. A vent portion 112 extends between and joins the first and second side plates 120, 130 to space apart the first and second side plates 120, 130 to form a plurality of vents 114. The vents 114 have an inlet 116 on the inner diameter of the vented area 110 and an outlet 118 on the outer diameter of the vented area 110. Air is drawn into the inlets 116 as the rotor 100 rotates. The air flows through the vents 114 and is expelled from the outlets 118. Friction generated by the braking force applied to the rotor 100 by the caliper generates heat and causes the rotor 100 to increase in temperature, which can weaken the material of the brake rotor 100. Air flowing through the vents 114 absorbs and carries away heat generated by braking to produce a cooling effect, thereby allowing greater braking forces to be applied to the rotor 100 without damaging the brake rotor 100 from overheating. The vent portion 112 may be any structure that spaces apart the inner surfaces to form vents 114 in the vented area 110 between the first and second side plates 120, 130, such as, for example, vanes, posts, or the like. The illustrated first vented portion 112 includes straight vanes, though the vanes may be curved or segmented to alter the flow path of cooling are flowing through the vented area 110 of the spinning rotor during use.

Figure 3:
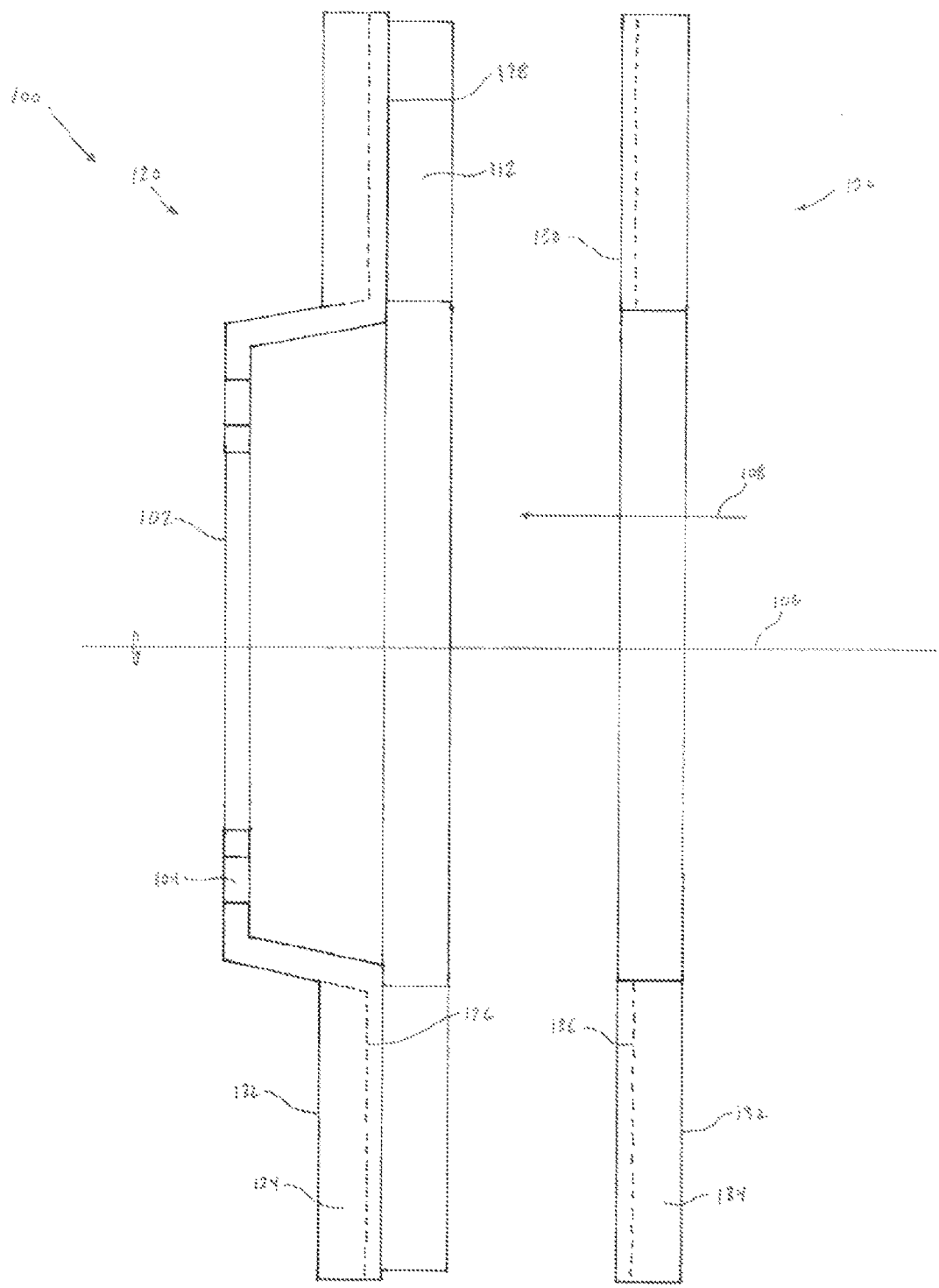
FIG. 3 is a cross-section view of the vented brake rotor of FIG. 1 along the line 3-3 with the first and second side plates in an un-welded condition.

Referring now to FIG. 3, a cross-sectional view of the brake rotor 100 is shown with the first and second side plates 120, 130 in an un-welded condition—as separate components. The first and second side plates 120, 130 each have inner surfaces 128, 138 that are welded together to form the vented brake rotor 100. In the illustrated embodiment, the first vent portion 112 extends from the first inner surface 128 to the second inner surface 138. The distance between the first and second inner surfaces 128, 138 is about 0.3 inches to about 0.8 inches. In some embodiments, the distance between the first and second inner surfaces 128, 138 is about 0.41 inches.

Figure 4:
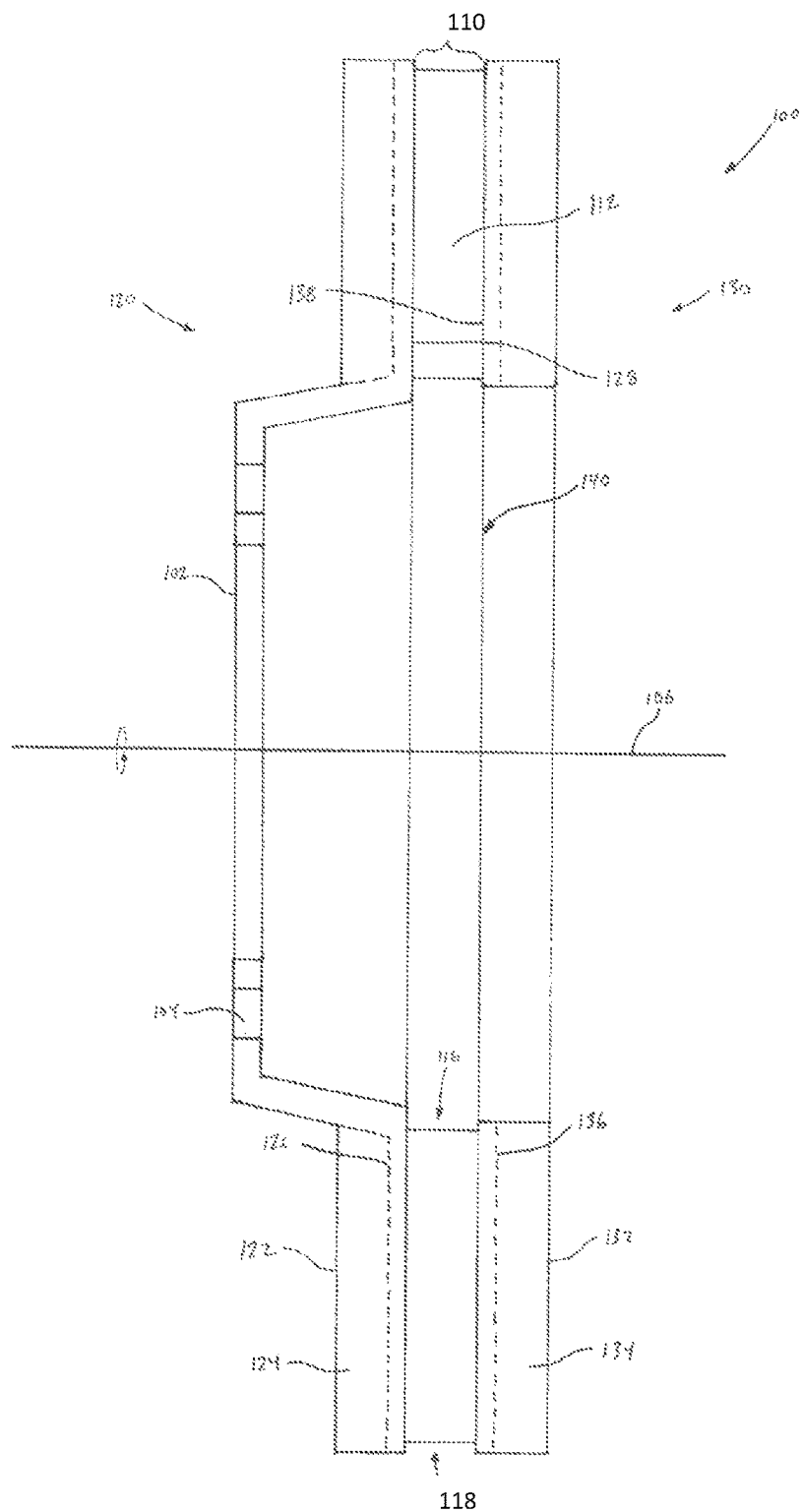
FIG. 4 is a cross-section view of the vented brake rotor of FIG. 1 along the line 3-3 with the first and second side plates in a welded condition.

The cross-sectional view reveals MMC portions 124, 134 disposed at each of the outer surfaces 122, 132 of the first and second side plates 120, 130. The MMC portions 124, 134 extend toward the inner surfaces 128, 138 from the outer surfaces 122, 132 to MMC boundaries 126, 136. The MMC boundaries 126, 136 are spaced apart from inner surfaces 128, 138 by first and second distances, respectively, that are less than a thickness measured between the inner 128, 138 and outer surfaces 122, 132. In some embodiments, the first and second distances are about 0.03 inches to about 0.10 inches. Thus, the inner surfaces 128, 138 and vent portion 112 are entirely free from MMC components, thereby enabling the inner surfaces 128, 138 to be machined or welded without the use of special tools needed to machine MMC materials. In some embodiments, the first MMC portion 124 extends to the first inner surface 128 and the vent portion 112 is entirely free from MMC components. As shown in FIG. 4, the first and second side plates are welded together at a weld 140 that may be formed by the methods disclosed herein, such as, for example, rotational welding or fusion welding.

Rotational welding according to an embodiment of the present application is generally performed using machine such as a rotational welding lathe. Rotational welding involves pressing two metal surfaces of the side plates together and rotating them relative to each other to scrape away the oxide layer and to increase the temperature of the material so that a metal bond (i.e., a weld) forms without reaching the melting point of the metal. To generate friction between the side plates, one of the plates may be rotated continuously while the other plate is fixed, or both plates may be rotated continuously in opposite directions. In some embodiments, the rotation of the plates is discontinuous; that is, one or both of the plates is rotated back and forth—first in one direction and then in the opposite direction—in rapid succession to generate heat. When the desired temperature is reached, the metal surfaces are pressed together to cure the weld.

In some embodiments, the components are rotated continuously at about 500 to about 1,500 revolutions per minute, or at about 800 to about 1,200 revolutions per minute. When pressing the components together to cure the weld the pressure applied ranges from about 100 to about 1,000 pounds per square inch. The weld temperature reached at the inner surfaces of the rotating parts ranges from about 1,100 to about 1,250 degrees Fahrenheit. In some embodiments, one or both of the inner or weld surfaces may be preheated—e.g., through resistance heating—to a temperature in a range of, for example, about 400 to about 900 degrees Fahrenheit. However, the welding temperature, rotations per minute of the spinning component or components, the pressure applied to cure the weld, and the preheat temperature may all be varied based on the materials used and surface area of the weld areas.

To weld the side plates 120, 130 together by rotational welding, the side plates 120, 130 are rotated around an axis of rotation 106 and pressed together as indicated by arrow 108 as shown in FIG. 3. During rotational welding, the side plates 120, 130 are moved together until the first vent portion 112 of the first inner surface 128 contacts the second inner surface 138. One or both of the side plates 120, 130 is then rotated to generate friction between the side plates 120, 130. When a sufficient temperature is reached, a plastic zone is created between the first vent portion 112 and the second inner surface 138 and the two side plates 120, 130 are pressed together to form the weld 140. After welding, the rotor 100 can be machined to its final dimensions.

Fusion welding according to an embodiment of the present application generally involves heating one or both of the two side plates to be welded and pressing them together to form a weld. In some embodiments, the side plates are placed in a grounded lathe such that an electrical circuit is closed when the plates are pressed together. As electrical current flows through the parts they are heated through resistance heating. When the desired temperature is reached, the metal surfaces are pressed together to cure the weld.

In some embodiments, the weld temperature ranges from about 1,100 to about 1,230 degrees Fahrenheit. The pressure applied to push the parts together during fusion welding ranges from about 100 to about 300 pounds per square inch. One or both of the weld surfaces may be preheated—e.g., through resistance heating—to about 230 degrees Fahrenheit before the plates are brought together. The current required to heat the parts varies based on the pressure applied to press the components together and the contact area between the two parts. The welding temperature and the pressure applied to form the weld, may all be varied based on the materials used and surface area of the weld areas.

The welds joining two parts can be formed at the same time through fusion welding or individually. The electrical current used to weld the parts together ranges from about 8,000 amperes to about 30,000 amperes, or about 8,500 amperes to about 12,500 amperes. The current may be applied to all or multiple weld areas simultaneously or to individual weld areas. The current may be applied in one cycle that is held for about 1 second to about 6 seconds. The current may also be applied in multiple cycles—for example, up to about 40 cycles—that are each held for about 1 second to about 6 seconds. In some embodiments, the current is applied in 6-7 cycles of about 1 second each, or 8-11 cycles of about 2 second each, or 13-18 cycles of about 3 second each, or 23-30 cycles of about 4-5 seconds each, or about 34-38 cycles of about 6 seconds each.

In some embodiments, the parts are brought into contact with each other and then rotationally agitated, i.e., the plates are rapidly rotated back and forth a few degrees in each direction to scrape away the oxide layer before a current is applied and a weld is formed. The parts may be rotated about 3 degrees in each direction, about 1 degree in each direction, or less than 1 degree in each direction. The small degree of rotation during the fusion welding process allows for vent portions of each of the side plates to be substantially aligned and welded together. For example, vanes can be formed in each side plate and then welded together to form the vented brake rotor. The parts may also be heated to a desired temperature above the melting point to burn away the oxide layer through a high temperature burn off, such as, for example, a temperature ranging from about 1,250 to about 4,000 degrees Fahrenheit.

Figure 5:
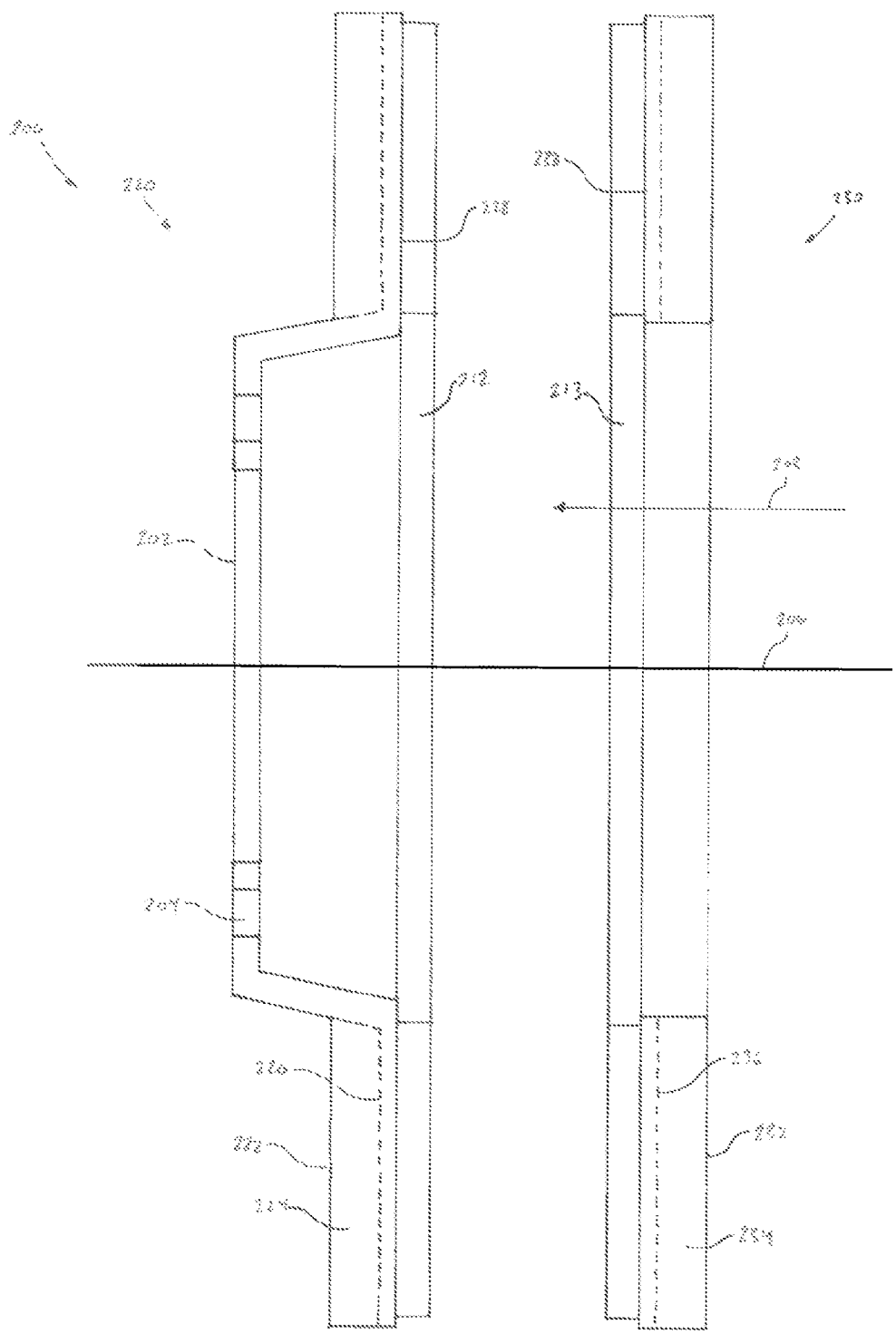
FIG. 5 is a cross-section view of a vented brake rotor with the first and second side plates in an un-welded condition.

Referring now to FIG. 5, a cross-sectional view of a vented brake rotor 200 is shown with first and second side plates 220, 230 in an un-welded condition—as separate components. Brake rotor 200 is similar to brake rotor 100, except that first and second vent portions 212, 213 extend from each of the first and second inner surfaces 228, 238, respectively. The first and second vent portions 212, 213 form vents 214 when welded together.

Figure 6:
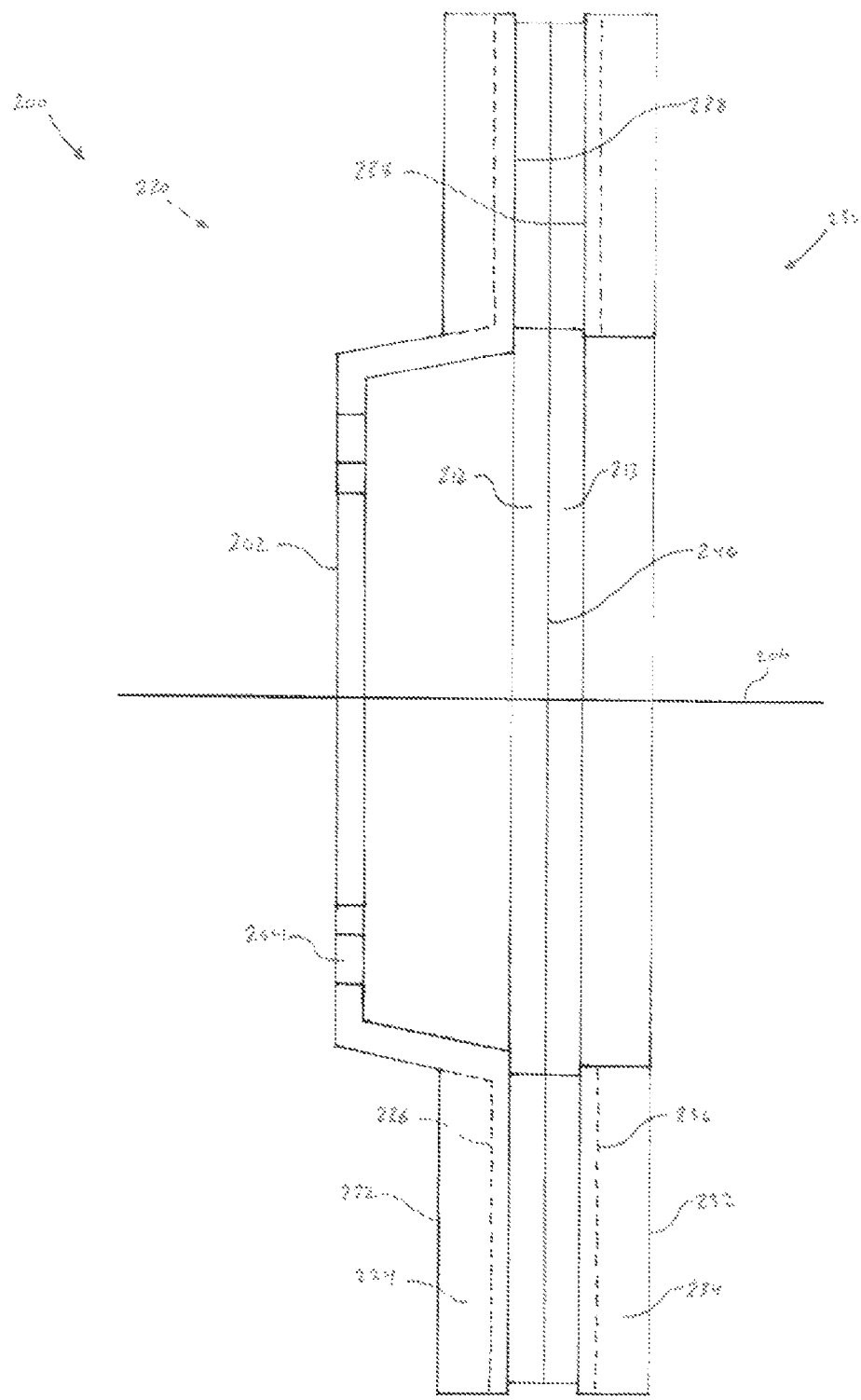
FIG. 6 is a cross-section view of the vented brake rotor of FIG. 5 with the first and second side plates in a welded condition.

Like brake rotor 100, the cross-sectional view of brake rotor 200 reveals MMC portions 224, 234 disposed at each of the outer surfaces 222, 232 of the first and second side plates 220, 230. The MMC portions 224, 234 extend toward the inner surfaces 228, 238 from the outer surfaces 222, 232 to MMC boundaries 226, 236. The MMC boundaries 226, 236 are spaced apart from inner surfaces 228, 238 by first and second distances, respectively, that are less than a thickness measured between the inner 228, 238 and outer surfaces 222, 232. In some embodiments, the first and second distances are about 0.03 inches to about 0.10 inches. Thus, the inner surfaces 228, 238 and vent portions 212, 213 are entirely free from MMC components, thereby enabling the inner surfaces 228, 238 and vent portions 212, 213 to be machined or welded without the use of special tools needed to machine MMC materials. In some embodiments, the first and second MMC portions 224, 234 extend to the first and second inner surfaces 228, 238 and the vent portions 212, 213 are entirely free from MMC components. As shown in FIG. 6, the first and second side plates are welded together at a weld 240 that may be formed by the methods disclosed herein, such as, for example, fusion welding.

To weld the side plates 220, 230 together by fusion welding, the side plates 220, 230 are pressed together as indicated by arrow 208 as shown in FIG. 5. During fusion welding, the side plates 220, 230 are moved together until the first vent portion 212 of the first inner surface 228 contacts the second vent portion 213 of second inner surface 238. In some embodiments, the first and second vent portions 212, 213 overlap so that the first vent portion 212 contacts the second inner surface 238 and the second vent portion 213 contacts the first inner surface 228. A current is then applied across the side plates 220, 230 to increase the temperature of the contacting surfaces. When a sufficient temperature is reached, a plastic zone is created between the vent portions 212, 213 and the two side plates 220, 230 are pressed together to form the weld 240. After welding, the rotor 200 can be machined to its final dimensions. The side plates 220, 230 may also be rotated back and forth around axis 206 shown in FIGS. 5-6 prior to or during fusion welding.

Figure 7A:
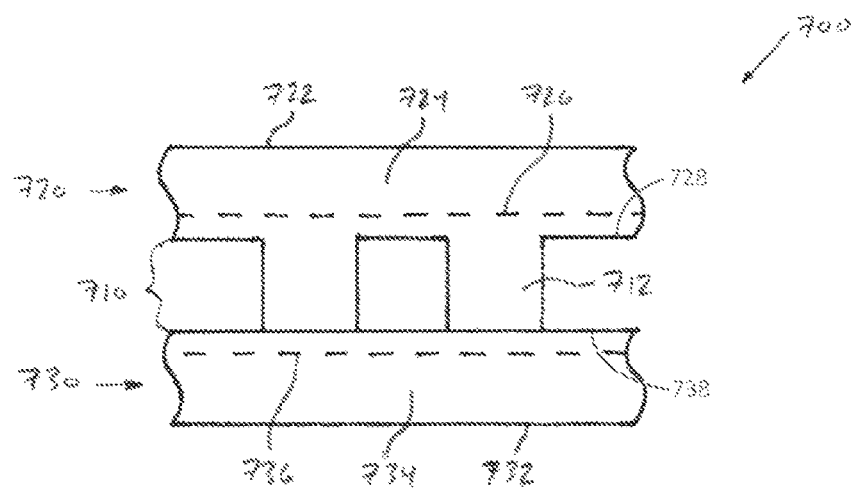
FIGS. 7A-7C are radial views illustrating exemplary vent portions of vented brake rotors according to embodiments of the present application.
Figure 7B:
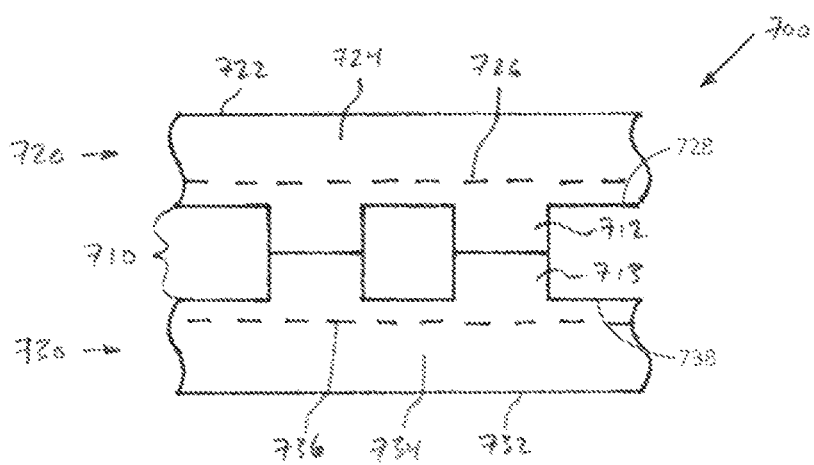
Figure 7C:
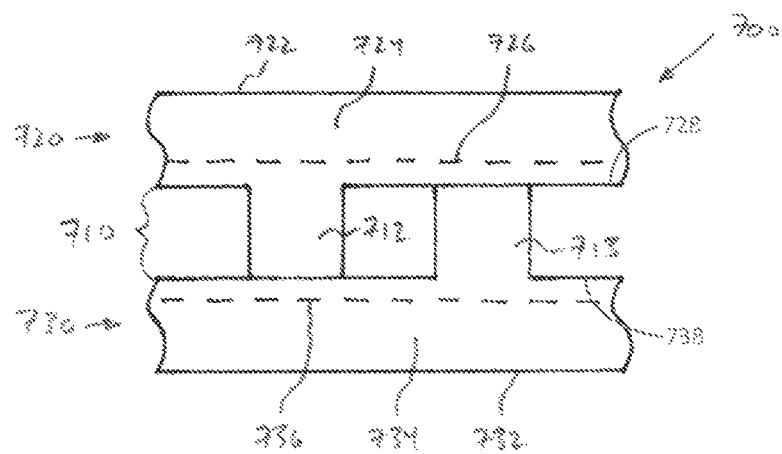

Referring now to FIGS. 7A-7C, radial views are shown of exemplary first and second vent portions of an exemplary vented brake rotor 700. The vented brake rotor 700 includes a vented area 710 formed between a first side plate 720 and a second side plate 730. Each side plate 720, 730 includes outer surfaces 722, 732 and inner surfaces 728, 738.

Like brake rotors 100 and 200, the cross-sectional views of brake rotor 700 reveals MMC portions 724, 734 disposed at each of the outer surfaces 722, 732 of the first and second side plates 720, 730. The MMC portions 724, 734 extend toward the inner surfaces 728, 738 from the outer surfaces 722, 732 to MMC boundaries 726, 736. The MMC boundaries 726, 736 are spaced apart from inner surfaces 728, 738 by first and second distances, respectively, that are less than a thickness measured between the inner 728, 738 and outer surfaces 722, 732. In some embodiments, the first and second distances are about 0.030 inches to about 0.100 inches. Thus, the inner surfaces 728, 738 and vent portions 712, 713 are entirely free from MMC components, thereby enabling the inner surfaces 728, 738 and vent portions 712, 713 to be machined or welded without the use of special tools needed to machine MMC materials.

As shown in FIG. 7A, the first side plate 720 includes a first vent portion 712 that extends from the first inner surface 728 to the second inner surface 738. Like brake rotor 100, the second inner surface 738 does not include a vent portion. The side plates 720, 730 of the embodiment shown in FIG. 7A can be welded together by any of the methods disclosed herein, such as, for example, rotational or fusion welding.

As shown in FIG. 7B, the first and second side plates 720, 730 include first and second vent portions 712, 713, respectively. Like brake rotor 200, the first vent portion 712 extends from the first inner surface 728 to meet the second vent portion 713 that extends from the second inner surface 738. The vent portions 712, 713 of the side plates 720, 730 of the embodiment shown in FIG. 7B are aligned during welding and thus cannot be welded by continuous rotational welding. However, the side plates 720, 730 can be welded together by any of the other methods disclosed herein, such as, for example, discontinuous rotational welding or fusion welding.

As shown in FIG. 7C, the first and second side plates 720, 730 include first and second vent portions 712, 713, respectively. The first and second vent portion 712, 713 overlap: the first vent portion 712 extends from the first inner surface 728 to the second inner surface 738, and the second vent portion 713 extends from the second inner surface 738 to the first inner surface 728. The overlapping vent portions 712, 713 of the side plates 720, 730 of the embodiment shown in FIG. 7C prevent the side plates 720, 730 from being welded together by continuous rotational welding. However, the side plates 720, 730 can be welded together by any of the other methods disclosed herein, such as, for example, discontinuous rotational welding or fusion welding.

Figure 8:
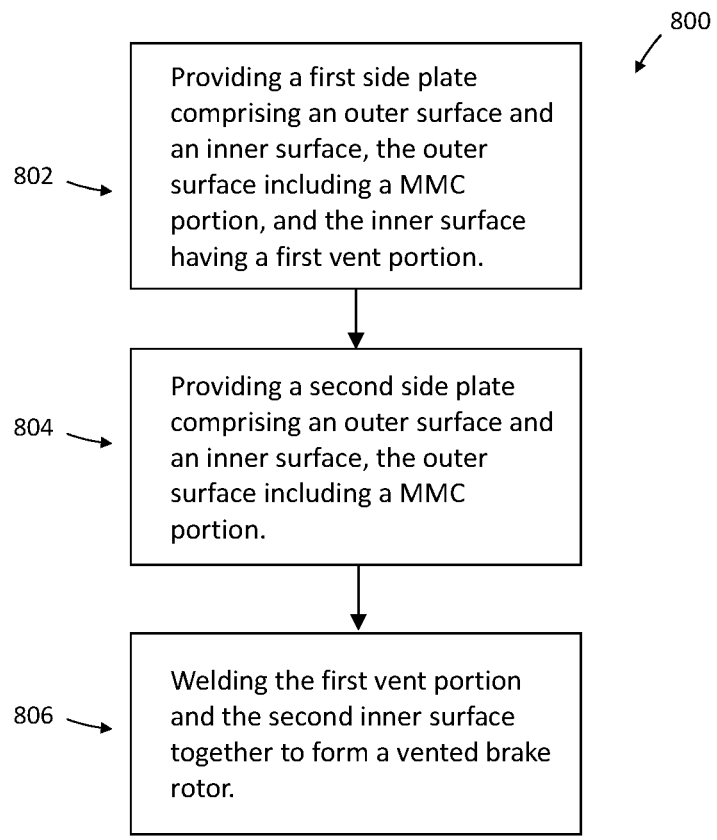
FIGS. 8 and 9 are flow charts describing exemplary methods of making a vented brake rotor.

Referring now to FIG. 8, a flow chart of an exemplary method 800 of forming a vented brake rotor is shown. The exemplary method 800 includes: providing a first side plate having a first outer surface and a first inner surface, the first outer surface including a MMC portion, and the first inner surface having a first vent portion, at 802; providing a second side plate having a second outer surface and a second inner surface, the second outer surface including a MMC portion, at 804; welding the first vent portion and the second inner surfaces of the first and second side plates together, at 806. In some embodiments, the second side plate includes a second vent portion. Exemplary method 800 can be implemented to form the exemplary vented brake rotors 100, 200, and 700 described above, or another vented brake rotor.

Welding step 806 may include rotational welding performed by: placing the first inner surface in contact with the second inner surface; rotating at least one of the first and second side plates at about 500 to about 1,500 revolutions per minute; heating at least one of the first and second surfaces to a weld temperature of about 1,100 to about 1,250 degrees Fahrenheit; and pressing the first and second side plates together at about 100 to about 1,000 pounds per square inch. Alternatively, welding step 806 may include fusion welding performed by: placing the first inner surface in contact with the second inner surface; heating at least one of the first and second surfaces via resistance heating to a weld temperature of about 1,100 to about 1,250 degrees Fahrenheit; and pressing the first and second side plates together at about 100 to about 300 pounds per square inch. Welding step 806 may also include preheating, rotational agitating, and/or high temperature oxide burn off as described above.

Figure 9:
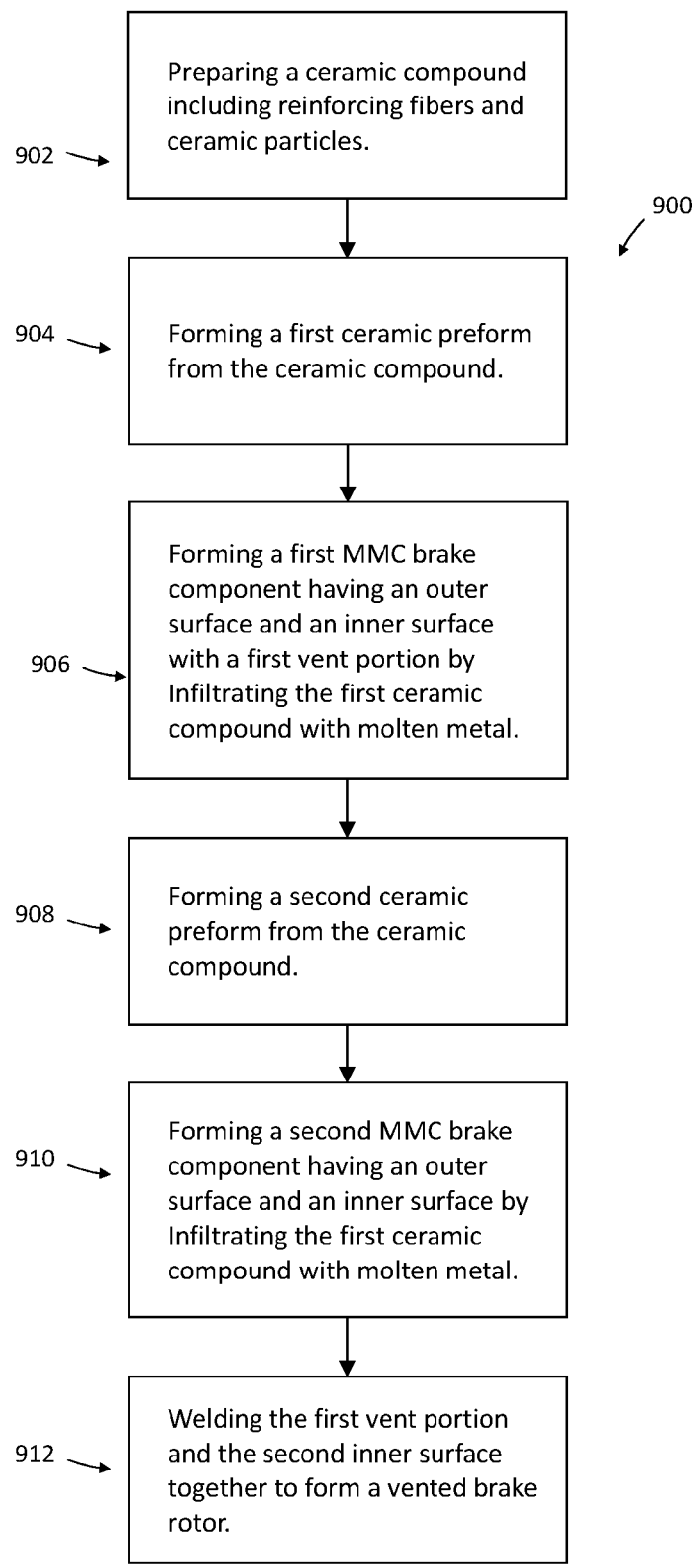

Referring now to FIG. 9, a flow chart of an exemplary method 900 of forming a vented brake rotor is shown. The exemplary method 900 includes: preparing a ceramic compound including reinforcing fibers and ceramic particles, at 902; forming a first ceramic preform from the ceramic compound, at 904; forming a first metal matrix composite brake component having inner and outer surfaces—the inner surface having a first vent portion—by infiltrating the first ceramic preform with molten metal, at 906; forming a second ceramic preform from the ceramic compound, at 908; forming a second metal matrix composite brake component having inner and outer surfaces by infiltrating the second ceramic preform with molten metal, at 910; and welding the first vent portion and the second inner surface together to form a vented brake rotor, at 912. In some embodiments, the second side plate includes a second vent portion. Exemplary method 900 can be implemented to form the exemplary vented brake rotors 100, 200, and 700 described above, or another vented brake rotor.

Welding step 912 may include rotational welding performed by: placing the first inner surface in contact with the second inner surface; rotating at least one of the first and second side plates at about 500 to about 1,500 revolutions per minute; heating at least one of the first and second surfaces to a weld temperature of about 1,100 to about 1,250 degrees Fahrenheit; and pressing the first and second side plates together at about 100 to about 1,000 pounds per square inch. Alternatively, welding step 912 may include fusion welding performed by: placing the first inner surface in contact with the second inner surface; heating at least one of the first and second surfaces via resistance heating to a weld temperature of about 1,100 to about 4,000 degrees Fahrenheit; and pressing the first and second side plates together at about 100 to about 300 pounds per square inch. Welding step 912 may also include preheating, rotational agitating, and/or high temperature oxide burn off as described above.

The methods described herein may be used to make a variety of vehicle and non-vehicle related components. This may include other vehicle components (e.g., non-rotating and non-rotationally symmetric vehicle components, such as portions of a vehicle body, vehicle frame, or vehicle suspension). For example, in certain embodiments, a first vehicle component may include a MMC portion and a first metal portion that is substantially free from MMC materials and a second vehicle component may include a MMC portion and a second metal portion that is substantially free from MMC materials such that it does not include an amount of MMC material that would affect the welding and machining of the metal portion. The first and second metal portions of the vehicle components can be welded together by any of the methods disclosed herein, such as, for example, rotational or fusion welding.

Figure 10:
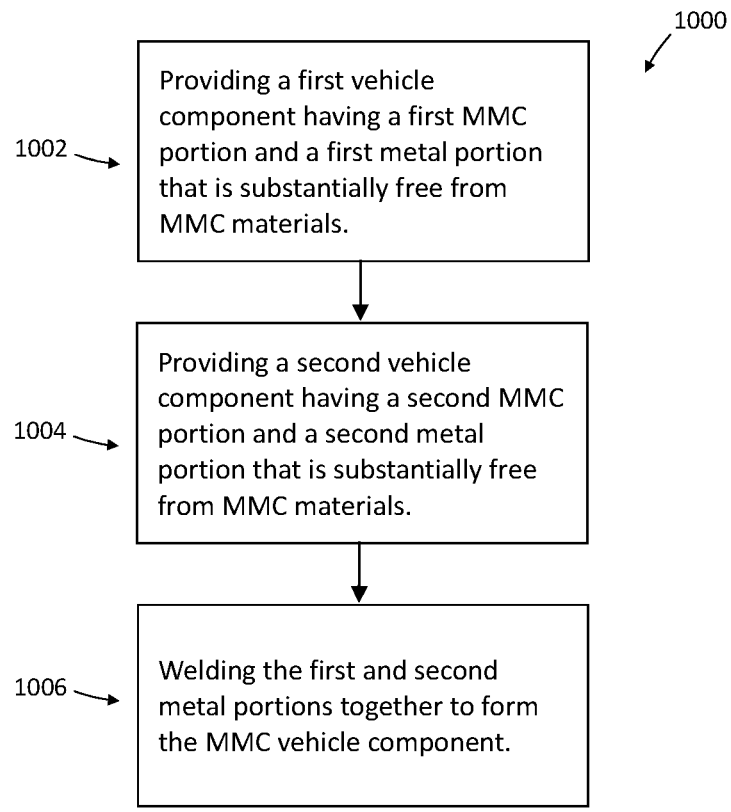
FIG. 10 is a flow chart describing exemplary methods of making metal matrix composite vehicle components.

Referring now to FIG. 10, a flow chart of an exemplary method 1000 of forming a metal matrix composite vehicle component is shown. The exemplary method 1000 includes: providing a first vehicle component having a first MMC portion and a first metal portion that is substantially free from MMC materials, at 1002; providing a second vehicle component having a second MMC portion and a second metal portion that is substantially free from MMC materials, at 1004; and welding the first and second metal portions together to form the MMC vehicle component, at 1006. Exemplary method 1000 can be implemented to form the exemplary vented brake rotors 100, 200, and 700 described above, or any other vehicle components including localized MMC portions.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed is:

1. A method of making a metal matrix composite vented brake rotor, the method comprising:
   providing a first side plate comprising a first outer surface, a first inner surface having a first vent portion, and a metal matrix composite portion extending from the first outer surface to a first distance from the inner surface that is less than a thickness measured between the first inner surface and first outer surface;
   providing a second side plate comprising a second outer surface, a second inner surface, and a metal matrix composite portion extending from the second outer surface to a second distance from the second inner surface that is less than a thickness measured between the second inner surface and second outer surface;
   welding the first vent portion of the first inner surface to the second inner surface to form the vented brake rotor, the vented brake rotor comprising a plurality of vents formed by the first inner surface, the first vent portion, and the second inner surface.

2. The method of claim 1, wherein the second inner surface has a second vent portion.

3. The method of claim 2, wherein the step of welding comprises welding the first vent portion of the first inner surface to the second vent portion of the second inner surface.

4. The method of claim 2, wherein the step of welding comprises welding the first vent portion of the first inner surface to the second inner surface and welding the second vent portion of the second inner surface to the first inner surface.

5. The method of claim 1, wherein the first and second distances range from about 0.03 inches to about 0.10 inches.

6. The method of claim 1, wherein the step of welding comprises rotational welding.

7. The method of claim 6, wherein rotational welding comprises:
   placing the first inner surface in contact with the second inner surface;
   rotating at least one of the first and second side plates at about 500 to about 1,500 revolutions per minute;
   heating at least one of the first and second surfaces to a weld temperature of about 1,100 to about 1,250 degrees Fahrenheit; and
   pressing the first and second side plates together at about 100 to about 1,000 pounds per square inch.

8. The method of claim 7, wherein rotational welding further comprises pre-heating at least one of the first and second surfaces to about 400 to about 900 degrees Fahrenheit before placing the first inner surface in contact with the second inner surface.

9. The method of claim 1, wherein the step of welding comprises fusion welding.

10. The method of claim 9, wherein fusion welding comprises: placing the first inner surface in contact with the second inner surface; heating at least one of the first and second surfaces via resistance heating to a weld temperature of about 1,100 to about 1,250 degrees Fahrenheit; and pressing the first and second side plates together at about 100 to about 300 pounds per square inch.

11. The method of claim 10, wherein fusion welding further comprises pre-heating at least one of the first and second side plates to about 230 degrees Fahrenheit before placing the first inner surface in contact with the second inner surface.

12. The method of claim 10, wherein fusion welding further comprises heating at least one of the first and second side plates to about 1,200 to about 4,000 degrees Fahrenheit before heating at least one of the first and second surfaces to a weld temperature.

13. The method of claim 10, wherein fusion welding further comprises repeatedly rotating at least one of the first and second side plates about 1 to about 3 degrees in a first direction and then about 1 to about 3 degrees in a second direction.

14. A method of making a metal matrix composite vented brake component, the method comprising:
preparing a ceramic compound comprising reinforcing fibers and ceramic particles;
forming a first ceramic preform from the ceramic compound;
forming a first metal matrix composite brake component by infiltrating the first ceramic preform with molten metal, the first metal matrix composite brake component comprising a first outer surface, a first inner surface having a first vent portion, and a metal matrix composite portion extending from the first outer surface to a first distance from the inner surface that is less than a thickness measured between the first inner surface and first outer surface;
forming a second ceramic preform from the ceramic compound;
forming a second metal matrix composite brake component by infiltrating the second ceramic preform with molten metal, the second metal matrix composite brake component comprising a second outer surface, a second inner surface, and a metal matrix composite portion extending from the second outer surface to a second distance from the second inner surface that is less than a thickness measured between the second inner surface and second outer surface;
welding the first vent portion of the first inner surface to the second inner surface to form the vented brake rotor, the vented brake rotor comprising a plurality of vents formed by the first inner surface, the first vent portion, and the second inner surface.

15. The method of claim 14, wherein the ceramic compound further comprises a fugitive porosity generating component, starch, a low temperature organic binder, a high temperature binder, and water.

16. The method of claim 14, wherein the second inner surface has a second vent portion.

17. The method of claim 16, wherein the step of welding comprises welding the first vent portion of the first inner surface to the second vent portion of the second inner surface.

18. The method of claim 16, wherein the step of welding comprises welding the first vent portion of the first inner surface to the second inner surface and welding the second vent portion of the second inner surface to the first inner surface.

19. The method of claim 14, wherein the step of welding comprises rotational welding.

20. The method of claim 14, wherein the step of welding comprises fusion welding.

* * * * *